(12) United States Patent
Seiler

(10) Patent No.: US 10,904,664 B2
(45) Date of Patent: Jan. 26, 2021

(54) DEVICE FOR GENERATING CHEST-CHAMBER ACOUSTIC RESONANCE AND DELIVERING THE RESULTANT AUDIO AND HAPTIC TO HEADPHONES

(71) Applicant: SONICSENSORY, INC., Los Angeles, CA (US)

(72) Inventor: Brock Maxwell Seiler, Jefferson Valley, NY (US)

(73) Assignee: SonicSensory, Inc., Los Angeles, CA (US)

( * ) Notice: Subject to any disclaimer, the term of this patent is extended or adjusted under 35 U.S.C. 154(b) by 0 days.

(21) Appl. No.: 16/081,256

(22) PCT Filed: Mar. 2, 2017

(86) PCT No.: PCT/US2017/020527
§ 371 (c)(1),
(2) Date: Aug. 30, 2018

(87) PCT Pub. No.: WO2017/151977
PCT Pub. Date: Sep. 8, 2017

(65) Prior Publication Data
US 2019/0069088 A1     Feb. 28, 2019

Related U.S. Application Data

(60) Provisional application No. 62/302,629, filed on Mar. 2, 2016.

(51) Int. Cl.
*H04R 3/12*     (2006.01)
*H04R 5/033*    (2006.01)
(Continued)

(52) U.S. Cl.
CPC .............. *H04R 3/12* (2013.01); *H04R 1/025* (2013.01); *H04R 1/1016* (2013.01); *H04R 1/16* (2013.01);
(Continued)

(58) Field of Classification Search
None
See application file for complete search history.

(56) References Cited

U.S. PATENT DOCUMENTS 5,687,244 A     11/1997  Untersander
8,391,516 B2 *   3/2013  Fletcher ................... H04R 1/26
                                                          381/151
(Continued)

FOREIGN PATENT DOCUMENTS

JP      2012-244350 A    12/2012
WO   WO 2015/065988 A1    5/2015

OTHER PUBLICATIONS

United Stapes Patent and Trademark Office, International Search Report for International Application No. PCT/US2017/020527 (dated Jun. 6, 2017).

(Continued)

*Primary Examiner* — Paul W Huber
(74) *Attorney, Agent, or Firm* — Neal, Gerber & Eisenberg LLP; Michael G. Kelber; Nawshaba M. Siddiquee

(57) ABSTRACT

Embodiments include a system for enhancing an audio listening experience, the system comprising an electrical device configured to impart vibrations, to a chest area of a user, based on an incoming audio signal and detect an acoustic resonance generated in a chest cavity of the user as a result of the vibrations; and an acoustic system configured to output the incoming audio signal in synchrony with the vibrations imparted to the chest cavity and simultaneously (Continued)

deliver haptic and audible vibrations associated with the acoustic resonance to the ears of the user. Embodiments also include a headphone system comprising an audio driver for outputting an incoming audio signal to the ears; and at least one acoustical port configured to deliver haptic and audible vibrations to the ear, the haptic and audible vibrations being associated with an acoustic resonance generated in a chest cavity of the user based on the audio signal.

18 Claims, 5 Drawing Sheets

(51) Int. Cl.
  *H04R 1/02* (2006.01)
  *H04R 1/10* (2006.01)
  *H04R 1/16* (2006.01)
  *H04R 1/28* (2006.01)
  *A63F 13/28* (2014.01)

(52) U.S. Cl.
  CPC ........... *H04R 1/2811* (2013.01); *H04R 5/033* (2013.01); *A63F 13/28* (2014.09); *H04R 2205/026* (2013.01); *H04R 2460/13* (2013.01)

(56) References Cited

U.S. PATENT DOCUMENTS

| | | | |
|---|---|---|---|
| 9,576,445 | B2 | 2/2017 | Cruz-Hernandez et al. |
| 2004/0199380 | A1 | 10/2004 | Kandel et al. |
| 2008/0112581 | A1* | 5/2008 | Kim .................. H04R 1/1075 381/151 |
| 2010/0239108 | A1 | 9/2010 | Fletcher |
| 2012/0070028 | A1 | 3/2012 | Margulies |
| 2014/0056461 | A1 | 2/2014 | Afshar |
| 2015/0070147 | A1 | 3/2015 | Cruz-Hernandez et al. |
| 2015/0146893 | A1* | 5/2015 | Kunimoto ............. H04R 5/033 381/151 |
| 2015/0156581 | A1 | 6/2015 | Efrati |
| 2015/0264470 | A1* | 9/2015 | Li ....................... H04R 1/1091 381/378 |
| 2016/0192060 | A1* | 6/2016 | Noertker ............. H04R 1/1075 381/74 |

OTHER PUBLICATIONS

The International Bureau of WIPO, International Preliminary Report on Patentability for International Application No. PCT/US2017/020527 (dated Sep. 4, 2018).

* cited by examiner

US 10,904,664 B2

DEVICE FOR GENERATING CHEST-CHAMBER ACOUSTIC RESONANCE AND DELIVERING THE RESULTANT AUDIO AND HAPTIC TO HEADPHONES

CROSS-REFERENCE TO RELATED APPLICATIONS

This application is a national phase of International Application No. PCT/US2017/020527, filed on Mar. 2, 2017, which claims benefit of U.S. Provisional Application No. 62/302,269, which was filed on Mar. 2, 2016 and is incorporated by reference herein in its entirety.

BACKGROUND

Consumers are seeking methods of enhanced audio from their electronic media for a more enriched audio immersive experience, as well as the multisensory feeling of being present within the audio-visual format they are engaged in. In addition, consumers are constantly seeking new ways of personalizing the products they interact with. Most forms of electronic media come with methods of modulating sound quality by controlling volume, tone, treble, bass, mid range, and various equalizer ("EQ") functions. These modes of modulation have been essentially the same for decades. Accordingly, there is a need in the art for new techniques for enhancing the audio listening experience.

SUMMARY

The invention described herein is intended to solve the above-noted problems by providing systems that are designed to, among other things, allow the user to uniquely modulate and personalize the audio component of an electronic media experience in a new way through "chest-chamber acoustic resonance," while simultaneously creating an audio synchronized haptic experience on and within the body for a deeper sense of being immersed in the electronic media experience.

For example, one embodiment includes a system for enhancing an audio listening experience, the system comprising an electrical device configured to impart vibrations, to a chest area of a user, based on an incoming audio signal and detect an acoustic resonance generated in a chest cavity of the user as a result of the vibrations; and an acoustic system configured to output the incoming audio signal in synchrony with the vibrations imparted to the chest cavity and simultaneously deliver haptic and audible vibrations associated with the acoustic resonance to the ears of the user.

Another example embodiment includes a wearable device for enhancing an audio listening experience. The wearable device includes an audio input device for receiving an incoming audio signal from an audio source; a vibration device configured to impart vibrations, to a chest area of the user, based on the incoming audio signal; at least one sensor configured to detect an acoustic resonance generated in a chest cavity of the user as a result of the vibrations; at least one audio output port configured to output the incoming audio signal in synchrony with the vibrations imparted to the chest cavity; and at least one vibration output port configured to output haptic and audible vibrations associated with the acoustic resonance detected by the at least one sensor.

Yet another example embodiment includes a headphone system comprising an audio driver for outputting an incoming audio signal to the ears; and at least one acoustical port configured to deliver haptic and audible vibrations to the ear, the haptic and audible vibrations being associated with an acoustic resonance generated in a chest cavity of the user based on the audio signal.

The appended claims define the invention described herein. The present disclosure summarizes aspects of the embodiments and should not be used to limit the claims. Other implementations are contemplated in accordance with the techniques described herein, as will be apparent to one having ordinary skill in the art upon examination of the following drawings and detailed description, and these implementations are intended to be within the scope of the invention described herein.

BRIEF DESCRIPTION OF THE DRAWINGS

For a better understanding of the invention, reference may be made to embodiments shown in the following drawings. The components in the drawings are not necessarily to scale and related elements may be omitted to emphasize and clearly illustrate the novel features described herein. In addition, system components can be variously arranged, as known in the art. In the figures, like referenced numerals may refer to like parts throughout the different figures unless otherwise specified.

DETAILED DESCRIPTION OF EXAMPLE EMBODIMENTS

Figure 1:
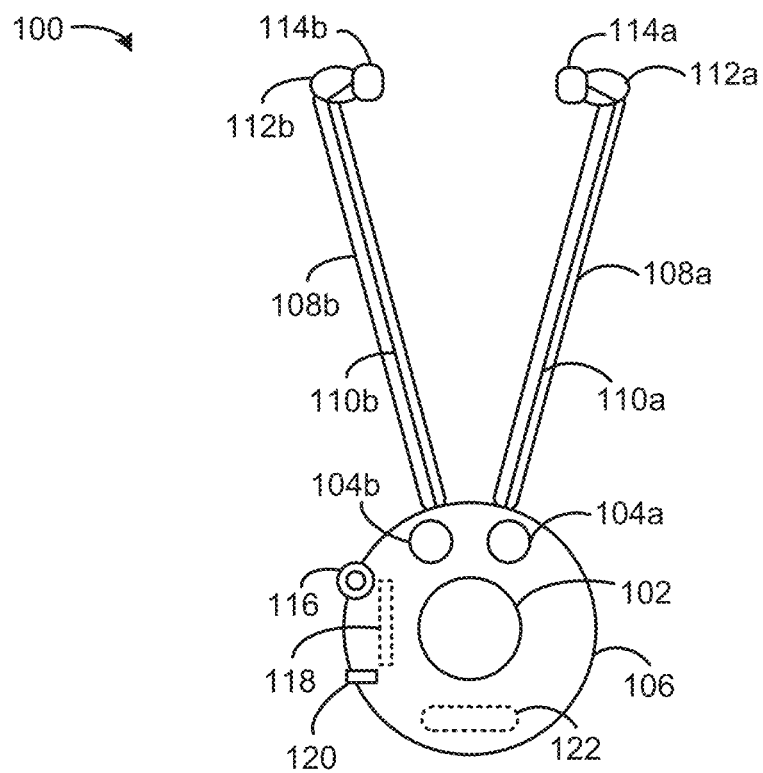
FIG. 1 illustrates an exemplary device for generating chest-camber acoustic resonance and delivering the resultant audio and haptic to headphones, in accordance with embodiments.

While the invention may be embodied in various forms, the Figures show and this Specification describes some exemplary and non-limiting embodiments, with the understanding that the present disclosure is to be considered an exemplification of the invention and is not intended to limit the invention to the specific embodiments illustrated. Also, not all of the depicted or described components may be required, and some embodiments may include additional, different, or fewer components. The arrangement and type of the components may vary without departing from the spirit or scope of the claims set forth herein.

In this application, the use of the disjunctive is intended to include the conjunctive. The use of definite or indefinite articles is not intended to indicate cardinality. In particular, a reference to "the" object or "a" and "an" object is intended to denote also one of a possible plurality of such objects.

The techniques described herein utilize the natural acoustic resonance chamber qualities of the individual user's chest cavity. The science of vocal training recognizes the potential effect of the air-filled lung chambers within the chest to provide acoustic resonance enhancement of bass tone. This is similar for example, to the way the air-filled resonance chamber of a violin or acoustic guitar works. Each individual will have their own unique, body-type specific acoustic resonance enhancement of bass tones due to the normal variations in individual chest anatomy. The individualized biophysics of chest-cavity acoustic resonance is utilized by the techniques described herein to amplify and uniquely personalize low-end/bass audio vibrations for the user to hear and feel.

Example embodiments include a chest chamber resonance device comprising a small transducer with adjustable amplitude capable of receiving audio signal and housed in a suitable body-contoured medallion-like unit made of suitable vibratory conductive material. The transducer is configured to receive only the low-end/bass component or other specified component of a given full-range audio signal. The transducer is positioned in said housing in such a way that that it imparts vibration to the underside of the vibratory conductive housing, which is designed to be placed flush against the mid chest, or mid back, or other location on the user. Also attached to said housing on either side of said transducer are two vibration and audio gathering sensors. These can be stethoscope-like sound-gatherers of a diaphragm or bell-type configuration. These vibration and audio gathering sensors are attached in such a way to the transducer housing as to allow them to be flush against the body surface of the user. Attached to these sound-gathering sensors are lengths of flexible sound and vibration conductive tubing that are of suitable length to span a distance from the transducer housing to the level of the user's ears. Said transducer and vibration and audio gathering sensor unit is held in place, flush against the sternum or midline of the posterior aspect of the thorax, or other body position, by a suitable adjustable harness, garment, or adhesive process.

When a full range electronic audio signal is received by the chest chamber resonance device described above, unique audio and haptic stimulation will be experienced by the user. As the transducer produces the low-end/bass frequency vibrations split from the full range signal, these are transmitted into the chest cavity of the user where unique bass acoustic resonance is created that is picked up by the vibration and audio gathering sensors and delivered mechanically as a low-end/bass audio and vibration to headphones in stethoscope-like fashion. In synchrony with this unique mode of bass audio and haptic experience, the headphones are designed to also receive the original full range electronic audio signal, with an adjustable EQ allowing the user to screen out the original electronic low-end signal, or combine it with the chest-chamber acoustic resonance low-end tones for an adjustable mix of bass tone immersion, completing a unique, full-range "body-personalized" audio and haptic reproduction for the user to experience.

Through the use of the techniques described herein, a variety of unique effects are experienced by the user. One of these is the auditory experience of the unique chest-chamber acoustic resonance bass frequencies. This opens up a new dimension for the listening experience in the form of "chest-chamber acoustic resonance" audio. Another dimension is the haptic effect of the transducer-generated low-end audio-synchronized vibrations entering the chest cavity, as well as the vibratory effect felt in the ears by the stethoscope-like transmission of the bass vibrations. By elevating the tactile feeling of the bass vibration component of the audio signal in these ways, the user has a deeper sense of being present at a high energy audio event, such as a rock concert, or being present in the landscape of an explosive video, video game, or virtual reality scenario where the vibratory concussion waves of high energy sound sources, like explosions, would be impacting the body and the natural vibration-gathering anatomy of the external ear.

Another use application may be the therapeutic effect of low-end audio vibration applied to thoracic cavity for stress reduction and relaxation. The techniques described herein also offer a fully unique way of using audio for biofeedback training. The stethoscope-like properties of the vibration and audio gathering sensors described above can be adjusted to focus on, and amplify the sound of the user's heart-beat and respiratory rhythm, and deliver these sounds to the ears. When coupled with a low volume relaxation musical format, the user can actively engage in the process of focusing their attention on modifying their heart rate and breathing rhythm through the process of having an audio connection to these body functions while engaged in relaxation-oriented, biofeedback related audio formats.

Another use application is the enhancement of the bass quality of vocalization. The techniques described herein can be utilized to direct the low-end/bass component of the user's microphone-generated vocal signal back into the actuator/transducer described above. This will result in chest-chamber resonance augmentation of the users own voice. Under normal circumstances, the lungs are poorly recruited as a resonance chamber for the human voice because the vocal cords lie above the lungs. By actively introducing the user's own low-end vocal vibrations into their chest chamber via the actuator/transducer, acoustic resonance of the chest chamber will be induced, producing an amplified and augmented "super-human" version to the user's vocal bass-tone qualities. This unique enhancement effect can be applied to all aspects of broadcasted vocal performance, in both live events, and for vocal recording purposes. The chest chamber resonance device or system can also have a dedicated/attached microphone for picking up and delivering the ambient audio in a given environment and enhancing it with chest-chamber acoustic resonance that is delivered to the ears in stethoscope-like fashion.

FIG. 1 demonstrates a device 100 for generating chest-chamber acoustic resonance and delivering the resultant audio and haptic to headphones, with the following labeled components: (A) a transducer or actuator 102 for imparting vibrations to the chest cavity of the user; (B) a pair of vibration and audio gathering sensors 104a and 104b for placement adjacent to the left and right lungs of the user; (C) a housing 106 for housing certain components of the device 100, including, for example, the transducer 102, printed circuit board ("PCB"), sensors 104a and 104b, potentiometer, audio input, and battery; (D) a pair of flexible hollow transfer tubes 108a and 108b (left and right) for delivering tactile vibrations to the ears of the user, the tubes 108 having embedded audio wires 110a and 110b (left and right) for delivering audio to the headphones worn by the user; (E) a pair of audio harvest acoustical portals 112a and 112b (left and right) mechanically coupled to the transfer tubes 108a and 108b opposite the housing 106; (F) a pair of earphones, earbuds, or any other type of headphones 114a and 114b (left and right) electrically coupled to the embedded wires 110a and 110b and mechanically coupled to the portals 112a and 112b; (G) a potentiometer 116 for controlling a volume or amplitude (e.g., on, off, increase, decrease); (H) a PCB 118 comprising various electronic components for carrying out the techniques described herein, such as, for example, a wireless receiver, transmitter, and/or transceiver, one or more amplifiers, and/or one or more digital signal processors ("DSP"); (I) an audio input port 120 for analog-in or otherwise receiving audio signals; and (J) a battery 122 for powering the electronic components within the housing 106.

Figure 2:
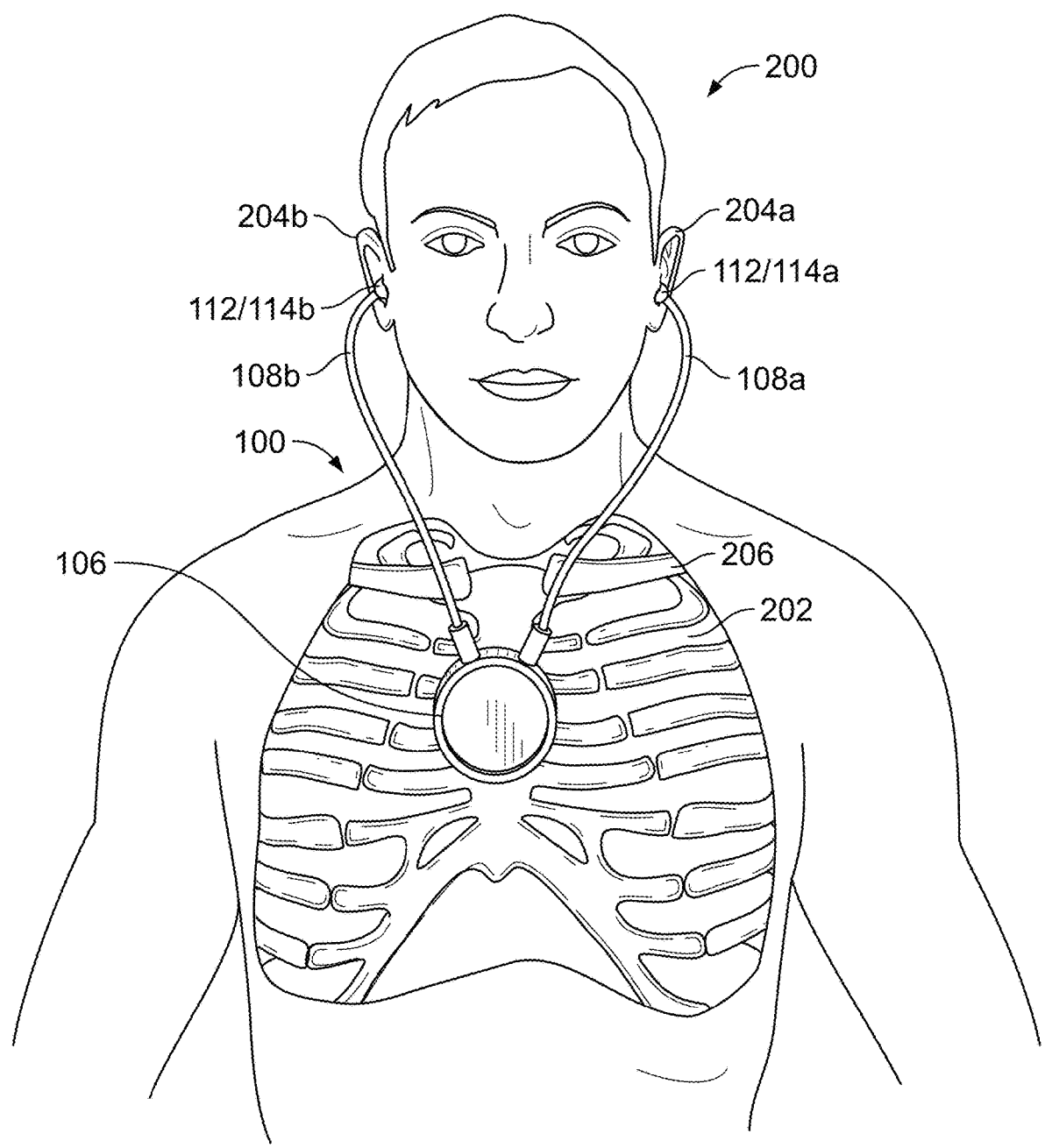
FIG. 2 illustrates an exemplary positioning of the device shown in FIG. 1 on the human body, in accordance with embodiments.

FIG. 2 demonstrates approximate positioning of the device 100 described in FIG. 1 on a human body or user 200. A partially-transparent depiction of the user's chest cavity 202 illustrates an exemplary location of chest-chamber acoustic resonance within the chest chambers. As also shown in FIG. 2, the earphones 114a and 114b and the acoustical ports 112a and 112b are worn in or on the user's ears 204a and 204b. In other embodiments, the device 100 can also be worn at the midline/spinal axis of the posterior aspect of the thorax at mid thoracic level, or in other desired positions.

As shown in FIG. 1, the housing 106 comprises the transducer 102, associated electronics (potentiometer 116, PCB 118, and audio input port 120), and battery 122, along with two attached vibration and audio gathering sensors 104a and 104b. Said housing 106 is made of a suitable vibratory conductive material and contoured such that that the underside of said housing can fit flush against the upper portion of the user's sternum along with the attached vibration and audio gathering sensors 104a and 104b. Transducer 102 has an adjustable potentiometer 116 with a dial, as shown in FIG. 1, for raising or lowering the amplitude of vibrations imparted by the transducer 102, or turning the vibrations on or off. Transducer 102 is capable of receiving an audio signal focused on a selected frequency of a full range audio signal from PCB 118. Said housing 106 also contains an audio input port 120 for receiving an analog audio signal via a direct wired connection, as well as a PCB 118 that includes a suitable audio signal splitter and filter capable of sending a selected low-end or other selected frequency signal to the transducer 102, while not affecting the original full range audio which is sent to the ears via the audio wires 110a and 110b imbedded in transfer tubes 108a and 108b, respectively. Electronics within the PCB 118 are capable of receiving and sending full range audio to earphones 114a and 114b via the embedded audio wires 110a and 110b, which are electronically coupled to the earphones 114a and 114b, while simultaneously sending only the selected frequency component of the same full-range audio signal to the transducer 102. Electronics within the transducer 102 and the PCB 118 can also include one or more DSPs for independent digital signal processing to the transducer 102 and the earphones 114a and 114b.

When the low-end audio signals are sent to the transducer 102, it will vibrate accordingly and transmit the same low-end vibration to the inside (or backside) surface of the housing 106. Because the inside surface of the housing 106 is in contact with the body of the user, it will transmit low-end audio vibration into the sternum, which will simultaneously induce acoustic resonance in each of the air-filled lung cavities, producing a base-tone "chest-chamber acoustic resonance." This chest chamber acoustic resonance is picked up by the stethoscope-like vibration and audio gathering sensors 104a and 104b, and transmitted mechanically via transfer tubes 108a and 108b to acoustical portals 112a and 112b, which are designed for attachment to the earphones 114a and 114b. Transfer tubes 108a and 108b are made of thin flexible resonating material. There are vibration and audio gathering sensors 104a and 104b for the left and right lungs. Electronics within the PCB 118 can allow the user to experience at the level of the earphones 114a and 114b the full range audio minus the original bass signal which is substituted for by the chest-chamber augmented bass, or experience the chest-chamber augmented bass blended with the original bass frequencies of the full range audio signal.

As shown in FIG. 2, the housing 106 is held in place at the level of the user's upper sternum just below the level of the collar bones 206, or in other desired positions. The housing 106 can be held in place on the user's body 200 via any suitable means, including, for example, a harness system, a garment or other wearable item, or an adhesive or other fastener.

Exemplary Application 1:

When a full range audio signal, such as, for example, a musical recording or soundtrack, is received by an audio receiver included in the PCB 118, it will split out the low end frequency and send it to the transducer 102, while also sending the full range audio signal to earphones 114a and 114b via embedded audio wires 110a and 110b in transfer tubes 108a and 108b. The chest chamber resonance created by the transducer 102 is collected as unique body-modified base tone by the two stethoscope-like vibration and audio gathering sensors 104a and 104b and conducted via the gathering tubes 108a and 108b to acoustical portals 112a and 112b in the earphones 114a and 114b. The unique effect is that the user will hear the standard full range audio signal simultaneously with the chest chamber resonance augmented base tone, which deeply enriches the base tone quality of the audio experience in a way completely unique to the users own anatomy. Unique haptic immersion is created by the vibration effect to the ears produced by the mechanical conduction of sound vibration from the gathering tubes 108a and 108b and acoustical portals 112a and 112b to the skin surface of the ears via the earphones 114a and 114b. This augmented audio and haptic immersion can be applied to all full variety audio signals associated with all electronic media devices for things such as, but not limited to, music, movies, video games, and virtual reality formats. As an additional feature, separate from the audio chain of an entertainment format, the DSP within the PCB 118 can be programmed to activate the transducer 102 via embedded commands within the entertainment content.

Exemplary Application 2:

The device described in Exemplary Application 1 can be utilized as a relaxation and/or bio-feedback tool in conjunction with a relaxation or stress reduction oriented musical format. Bass tones are generally utilized for their relaxing and soothing effect, and the unique audio and haptic enhancement of bass tones by the techniques described herein can be directed to this purpose. For bio-feedback, a sufficiently low amplitude, monotone, low frequency musical signal is sent to the transducer 102 and earphones 114a and 114b, such that the stethoscope-like transmission of chest cavity vibration via the sensors 104a and 104b and the transfer tubes 108a and 108b can highlight the delivery of the sound of the user's own breathing and heartbeat to the ears, above the level of the musical signal. While listening to the relaxing background audio track, the user can relax and focus on the sound of their own heart and breathing rate, and work to lower these rates, as is one of the desired goals in bio-feedback and relaxation technique training.

Exemplary Application 3:

The device described in Exemplary Application 1 can be configured such that the electronics within the PCB 118 are receiving, in real time, an audio signal from the user's own voice via a wireless or hard wired microphone. As the user speaks or sings into this microphone, the low-end component of the transmitted vocal signal is split and sent to the transducer 102. The resultant base tone augmentation of the user's voice by chest-chamber acoustic resonance will amplify and enrich the base tonality of the user's voice in real time as it leaves the vocal cavity. This augmented vocal tonality is simultaneously broadcasted by the same microphone to loud speakers or a PA system associated with the performance. This would be achieved by a suitable attached audio signal splitter capable of directing the user's voice signal simultaneously from the microphone to both the device 100 shown in FIG. 1 and a PA system for amplification.

Because the vocal cords lie above the lungs, the lungs are normally poorly recruited as base resonance chambers for the human voice. By introducing the base component of the user's own voice into the chest chambers via the transducer 102, the entire chest cavity becomes a vocal bass resonance chamber, adding a "super-human" bass quality to the projection of the user's vocals. This effect will be useful in adding a deeper quality to vocal performances of all kinds. This application can be used with or without the use of the headphone apparatus shown in FIG. 1. The device 100 can also have a dedicated/attached microphone for picking up and delivering the ambient audio in a given environment and enhancing it with chest-chamber acoustic resonance that is delivered to the ears in stethoscope-like fashion.

The device described in Exemplary Applications 1-3 can be turned around and applied to the posterior aspect of the user's thorax along the spinal axis at the level of mid thoracic spine for a similar effect with a different directional haptic quality, if desired. The device 100 described herein may also be used at other desired positions on the body.

Figure 3:
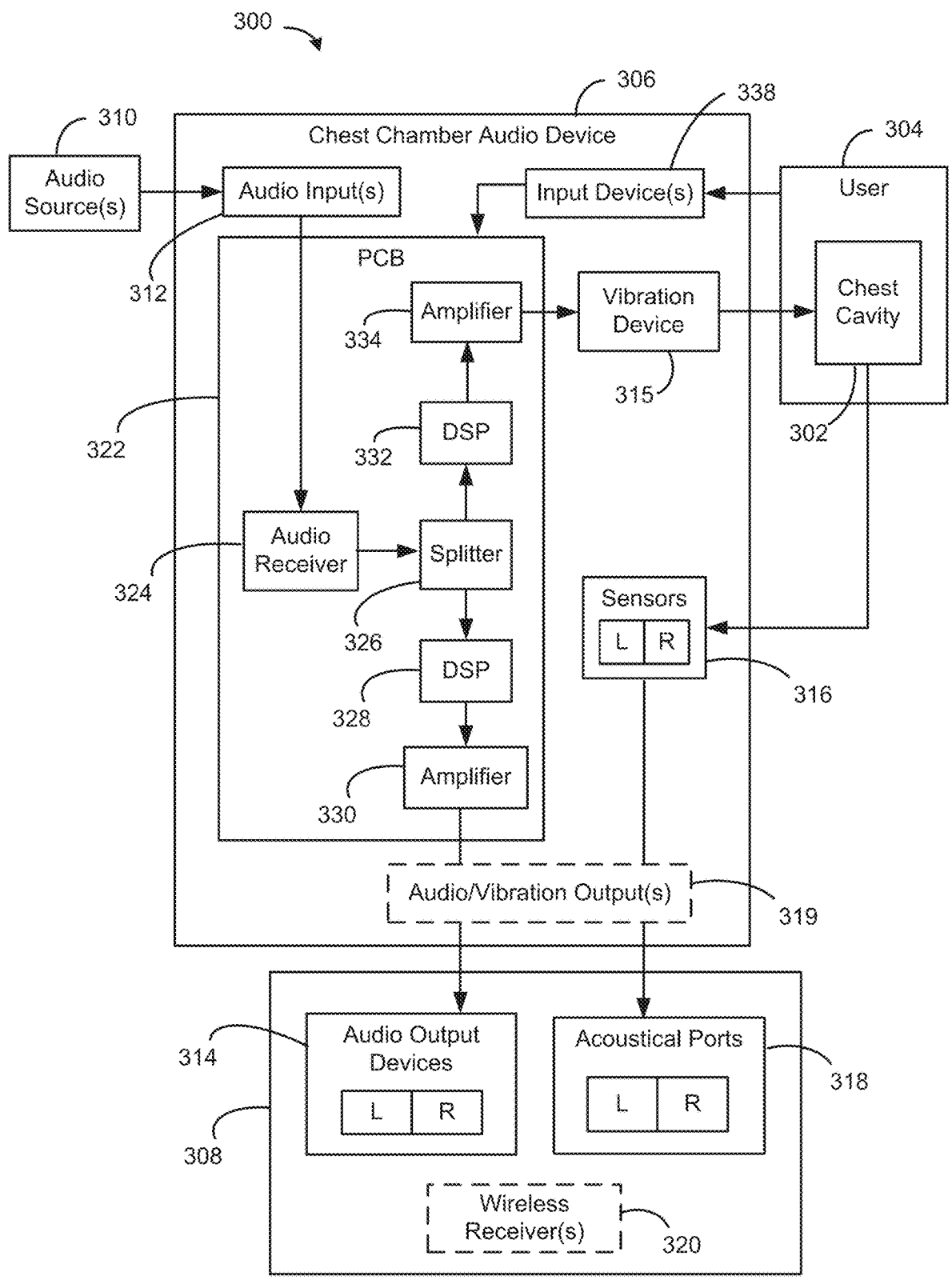
FIG. 3 is a block diagram of an example system comprising a chest chamber resonance device in accordance with embodiments.

FIG. 3 illustrates an exemplary system 300 for generating chest-chamber acoustic resonance within a chest cavity 302 of a user 304 using a chest chamber resonance device 306 and delivering the resultant audio and haptic to the ears of the user 304 via an acoustic system 308, in accordance with embodiments. The system 300 may be used to implement one or more of the exemplary applications described herein, including exemplary applications 1 and 2. For example, in some embodiments, the system 300 may be implemented as a single unit that is worn by the user 304, such as, for example, the device 100 shown in FIG. 1. In such cases, the housing 106 and all of the components included therein form the chest chamber resonance device 306. Further, the transfer tubes 108a and 108b, the audio wires embedded therein 110a and 110b, the acoustical ports 112a and 112b, and the earphones 114a and 114b form the acoustic system 308.

In other embodiments of the system 300, the chest chamber resonance device 306 can be selectively or removably coupled to the acoustic system 308. In such cases, the acoustic system 308 may include one or more conventional components (such as, for example, standard speakers for delivering audio to the ears of the user 304), one or more specialized components (such as, for example, acoustical ports for delivering acoustic resonance audio and vibrations to the ears of the user 304, as described herein), or a combination thereof.

The chest chamber resonance device 306 can be secured against or adjacent to the user's chest, using any suitable technique, including, for example, adhesives, suction cups, or other fasteners, a lanyard or other wearable item, etc. During operation, the chest chamber resonance device 306 receives an audio signal from one or more audio sources 310 communicatively coupled to one or more audio input ports 312 (such as, e.g., analog-in 120 shown in FIG. 1) of the chest chamber resonance device 306. In some embodiments, the audio source 310 is a microphone for picking up ambient audio or for picking up a user's voice while singing or speaking into the microphone, as described with respect to FIG. 4 and Exemplary Application 3. In other embodiments, the audio source 310 is a media player, such as, for example, an MP3 player or other portable player, a stereo system, a smartphone, tablet, laptop, computer, or any other device capable of playing audio.

In some embodiments, the audio source 310 is wirelessly coupled to the chest chamber resonance device 306, for example, using Bluetooth®, WiFi, or other wireless communication technology. In such cases, the audio input 312 includes a wireless receiver (e.g., radio receiver) and other wireless communication circuitry for receiving the wireless audio signal. In other embodiments, the audio source 310 is coupled to the chest chamber resonance device 306 through a wired connection. In such cases, the audio input 312 is an audio-in port for receiving an audio connector, such as, for example, a 3.5 mm audio plug, a Universal Serial Bus ("USB") connector, etc.

In still other embodiments, the chest chamber resonance device 306 can include more than one audio input 312 in order to receive audio signals from multiple audio sources 310. For example, in some cases, the system 300 may include a first audio source 310 that is a microphone configured to detect ambient sound and provide the detected audio to the chest chamber resonance device 306 via a first audio input 312. The system 300 may also include a second audio source (not shown) that is a media player configured to provide a pre-recorded audio signal to the chest chamber resonance device 306 via a second audio input (not shown). In such cases, the one or more audio inputs 312 can include any combination of wired and wireless audio ports.

The chest chamber resonance device 306 provides the full-range audio signal received from the audio source 310 to one or more audio output devices 314 (such as, e.g., earphones 114a and 114b shown in FIG. 1) included in the acoustic system 308. The audio output devices 314 deliver the audio signals to the ears of the user 304 and can be coupled to the chest chamber resonance device 306 via a wired or wireless connection. As an example, the one or more audio output devices 314 can be earphones, ear buds, in-ear headphones, over-ear headphones, or any other type of personal audio output device, or loudspeakers, such as, for example, speakers in a stereo or surround sound system, a public address system, or other audio listening device.

The chest chamber resonance device 306 also provides the audio signal to a vibration device 315 (such as, e.g., transducer 102 shown in FIG. 1) included in the device 306 for generating a vibration signal based on a low frequency portion of the audio signal, or other selected frequency components of the signal. When the vibration device 315 is placed against the user's chest, for example, as shown in FIG. 2, the device 315 imparts vibrations in accordance with the vibration signal to the chest of the user 304. These vibrations generate chest chamber acoustic resonance within the chest cavity 302 of the user 304. The vibration device 315 can be any type of device capable of imparting vibrations to the user 304, including, but not limited to, a haptic transducer or an actuator.

The chest chamber resonance device 306 further includes at least one audio and vibration gathering sensor 316 (such as, e.g., the sensors 104a and 104b shown in FIG. 1) that are placed against the user's chest (e.g., adjacent the right and left lungs) in order to detect or pick up the chest chamber acoustic resonance generated by the vibration device 315. The sensor(s) 316 provide the detected resonance audio and vibrations to a pair of acoustical ports 318 (such as, e.g., acoustical ports 112a and 112b shown in FIG. 1) included in the acoustic system 308. The acoustical ports 318 are configured to be worn in the ears of the user 304 and deliver audio and vibration frequencies associated with the chest chamber acoustic resonance to a skin surface of the ears. For example, the acoustical ports 318 can include flexible earpieces that are sized and shaped to fit within or against the ear canal. Thus, the user feels vibrations associated with the chest chamber resonance that is generated based on the audio signal, while simultaneously listening to the full-range audio signal reproduced by the audio output devices 314.

In some embodiments, the at least one sensor 316 includes one or more resonators configured to pick up low frequency sounds and/or vibrations produced by the acoustic resonance, or acoustic pressure waves, within the chest cavity 302, similar to the resonators included in an acoustic stethoscope for listening to lung and heart sounds. In such cases, the sensor(s) 316 mechanically transmit the detected sounds and/or vibrations to the user's ears through air-filled hollow tubes (such as, e.g., the transfer tubes 108a and 108b shown in FIG. 1) that are mechanically coupled between the sensor(s) 316 and the acoustical ports 318, like a stethoscope. The hollow tubes can be configured to deliver the chest chamber acoustic resonance to the ears of the user using air and mechanical conduction, like a stethoscope.

In other embodiments, the sensor(s) 316 are microphones or microphone heads configured to detect the chest chamber acoustic resonance within the chest cavity 302 and convert the detected resonance (e.g., audio and vibratory frequencies) into an electrical audio signal (e.g., a "resonance signal") that serves as a representation of the resonance within the chest cavity 302. In such cases, the acoustical ports 318 can include micro-transducers, or other vibration devices, that are configured to vibrate based on the resonance signal received from the audio and vibration gathering sensors 318. For example, the transducers can generate a vibration signal designed to impart vibrations to the user's ears that replicate or reproduce the audio and vibratory frequencies associated with the chest chamber acoustic resonance within the chest cavity. In some embodiments, the resonance signal is wireless transmitted to the transducers of the acoustic system 308 by the chest chamber resonance device 306.

In the some embodiments (e.g., as shown in FIG. 1), the device 306 has two sensors 316 configured to be placed over or adjacent to right and left areas of the chest, such as, for example, the right and left lungs. In other embodiments, the device 306 may have one sensor 316 configured to be placed at a central location of the chest. In still other embodiments, the system 300 may include a plurality of sensors 316 that are positioned at various locations on the user's body, including outside of the device 306. In such cases, for example, structural extensions made of suitable vibratory conductive material may be used to attach the external sensors to the device 306. In other cases, the external sensors may be independently attached to the user and communicatively coupled to the device 306 via wired or wireless connections.

As shown in FIG. 3, the chest chamber resonance device 306 can include one or more audio/vibration output ports 319 for delivering audio and/or vibration data to the acoustic system 308 in accordance with one or more of the embodiments described herein. As an example, the output port(s) 319 can be communicatively coupled to the acoustic system 308 using one or more of an audio wire (e.g., wires 110a and 110b shown in FIG. 1), stethoscope-like tubes (e.g., transfer tubes 108a and 108b shown in FIG. 1), and a wireless connection (such as, e.g., Bluetooth, WiFi, or other wireless communication technology). In the case of an audio wire, an audio plug (such as, e.g., a 3.5 mm plug, a USB connector, or other connector) can be electrically coupled to at least one of the output ports 319 (such as, e.g., a 3.5 mm port, a USB port, etc.) in order to deliver the full-range audio signal to the acoustic system 308. In the case of transfer tubes, the one or more output port(s) 319 can be mechanically connected to first ends of the hollow, stethoscope-like tubes, and the other ends of the tubes can be mechanically coupled to the acoustical ports 318 worn in the ears of the user 304.

In the case of a wireless connection, at least one of the output port(s) 319 can include one or more wireless transmitters and other wireless communication circuitry for wirelessly transmitting audio and/or vibration signals to appropriate components of the acoustic system 308. Likewise, the acoustic system 308 can include one or more wireless receivers 320 and other wireless communication circuitry for receiving wireless signals from the appropriate output port 319 of the chest chamber resonance device 306. In such cases, the wireless connection may be implemented using Bluetooth, WiFi, Near Field Communication ("NFC"), or any other suitable wireless communication technology.

In some cases, the chest chamber resonance device 306 is coupled to the acoustic system 308 via a mechanical connection and a wired electrical connection. For example, an audio wire may be embedded within, or attached to, each transfer tube, such that the audio wire delivers the full-range audio signal to the audio output devices 314, while the transfer tubes simultaneously deliver the resonance audio and vibrations to the acoustic portals 318, for example, as shown in FIG. 1. As another example, the audio output device 314 may be a stereo system or other external audio system that receives the full-range audio signal from the chest chamber resonance device 306 via an audio wire that is separate from the transfer tubes mechanically coupled between the device 306 and the acoustical ports 318.

In other cases, the chest chamber resonance device 306 can be coupled to the acoustic system 308 via a mechanical connection and a wireless connection. For example, the one or more audio output devices 314 can be wirelessly connected to the chest chamber resonance device 306, while the acoustical ports 316 are mechanically connected to the device 306 via the transfer tubes. One example of this may be when the audio output device 314 is a stereo system In still other cases, the chest chamber resonance device 306 can be coupled to the acoustic system 308 via only wireless connections. For example, both the audio output devices 314 and the acoustical ports 318 can be wirelessly connected to the chest chamber resonance device 306. In such cases, the output ports 319 wirelessly transmit the resonance signal to the acoustical ports 318 for driving the transducers included therein, and wirelessly transmit the audio signal to the audio output devices 314 for delivery as an audible signal.

As shown in FIG. 3, the chest chamber resonance device 306 further includes a printed circuit board ("PCB") 322 (such as, e.g., PCB 118 shown in FIG. 1) comprising electronic components for carrying out the techniques described herein. In particular, the PCB 322 includes an audio receiver 324 for receiving the audio signal provided by the audio input 312 and processing the received signal using known techniques. The audio receiver 324 then provides the audio signal to a splitter 326 for splitting the audio signal into two signals. The splitter 326 provides the first audio signal to a first digital signal processor ("DSP") 328 or other audio processor configured to process the full-range audio signal according to the user's audio preferences, such as, for example, applying equalizer settings to the audio signal. The processed audio signal is then provided to an amplifier 330, for example, in order to amplify the audio signal according to the user's volume control preferences (e.g., on, off, higher, lower, etc.). The amplifier 330 then provides the amplified audio signal to the one or more audio output devices 314 for output to the user 304.

The splitter 326 also provides the audio signal to a second DSP 332 configured to filter out certain frequencies from the audio signal (such as, for example, high frequency components), so that only selected frequencies (such as, for example, low-end frequency components) remain. The DSP 332 provides the filtered signal to an amplifier 334 for amplifying the filtered signal, for example, in order to amplify the filtered signal according to the user's vibration control preferences (e.g., on, off, higher, lower, etc.). The amplifier 334 then provides the amplified audio signal to the vibration device 315 for imparting vibrations to the chest cavity 302 of the user 304. In some embodiments, the PCB 324 includes a high frequency filter instead of the second DSP 332 for filtering out the high frequency components of the audio signal. In other embodiments, the second DSP 332 may be configured to provide a full range of audio processing effects, including, for example, pitch shifting to optimize and enhance the chest chamber resonance. In still other embodiments, the PCB 324 may include a single DSP coupled to the splitter 326 for processing both components of the split audio signal, prior to transmitting the components to the amplifier 330 and the amplifier 334, respectively.

The chest chamber resonance device 306 can further include one or more input devices 338 for receiving a user input for controlling operation of the device 306. For example, the one or more input devices 338 can include a potentiometer (such as, e.g., potentiometer 116 shown in FIG. 1) or other volume controller for directly controlling an amplitude of the vibrations being output by the vibration device 315, or alternatively, an amplitude of the audio signal being output by the amplifier 334 to the vibration device 315, thereby indirectly controlling an amplitude of the vibrations output by the vibration device 315. Additionally or alternatively, the one or more input devices 338 can include a volume controller for controlling an amplitude or volume of the audio signal being output by the amplifier 330 to the audio output devices 314. The input device(s) 338 may be a dial, as shown in FIG. 1, or any other type of input device, such as, for example, buttons, switches, sliders, touchscreen, etc. The input device(s) 338 can be used to increase or decrease the volume or amplitude of an audio or vibration signal, as well as turn the signal on or off.

In some embodiments, the resonance signal generated by the microphones/sensors 316 is provided to the audio output device(s) 314 instead of the acoustical ports 318. For example, the resonance signal may be sent to a mixing circuit (not shown) included in the chest chamber resonance device 306 for combining, in real time, the resonance signal with the full-range audio signal received from the audio source 310. The combined signal can be transmitted by the device 306 to the audio output device 314 via a wired or wireless connection. In some such cases, the input devices 338 may include an independent volume control for the chest chamber resonance experienced by the user 304 and an independent control for the combined signal output by the device 306.

In some embodiments, the system 300 includes one or more external transducers (not shown), or other types of vibration devices, in addition to the vibration device 315. The external transducer(s) can be configured for placement at various locations on the thorax (such as, e.g., lung areas, vocal chords, chest chamber, front thorax, back thorax, etc.), or other suitable areas of the user's body, in order to impart vibrations to multiple areas of the user's body.

Each external transducer can be communicatively coupled to the chest chamber resonance device 306, via a wired or wireless connection, in order to receive an audio signal output by the PCB 322 of the device 306. In some cases, the PCB 322 may provide the same audio signal to each of the external transducers and to the vibration device 315. In such cases, the vibrations imparted by the external transducers may serve to augment the vibrations imparted by the vibration device 315. In other cases, the PCB 322 may generate different audio signals for different transducers depending on the location of the transducer on the user's body, thus generating a deeper or more enhanced acoustic resonance experience. In such cases, the PCB 322 may include a separate, independent DSP (not shown) for generating the audio signals to drive the external transducers and for otherwise controlling the external transducers.

In embodiments, each external transducer can be housed in a standalone unit that also includes an audio input for receiving an audio signal from the device 306 (such as, e.g., a wireless receiver), an audio receiver coupled to the audio input (e.g., similar to the audio receiver 324), a DSP for processing received audio signals (e.g., similar to the DSP 332), one or more input devices for controlling an amplitude of the vibrations imparted by the external transducer (e.g., similar to the input device(s) 338), and an amplifier for amplifying the audio signal accordingly (e.g., similar to the amplifier 334). In some embodiments, each external transducer unit further includes one or more audio and vibration gathering sensors for detecting acoustic resonance generated in the chest chamber 302 by the external transducer (e.g., similar to the sensors 316). In such embodiments, each external transducer unit may also be coupled to the ears of the user in order to provide the detected audio and/or vibratory frequencies thereto. The vibrations may be mechanically conducted to the ears, such as, e.g., via the transfer tubes 108a and 108b, or wirelessly transmitted as a corresponding electrical signal.

Figure 4:
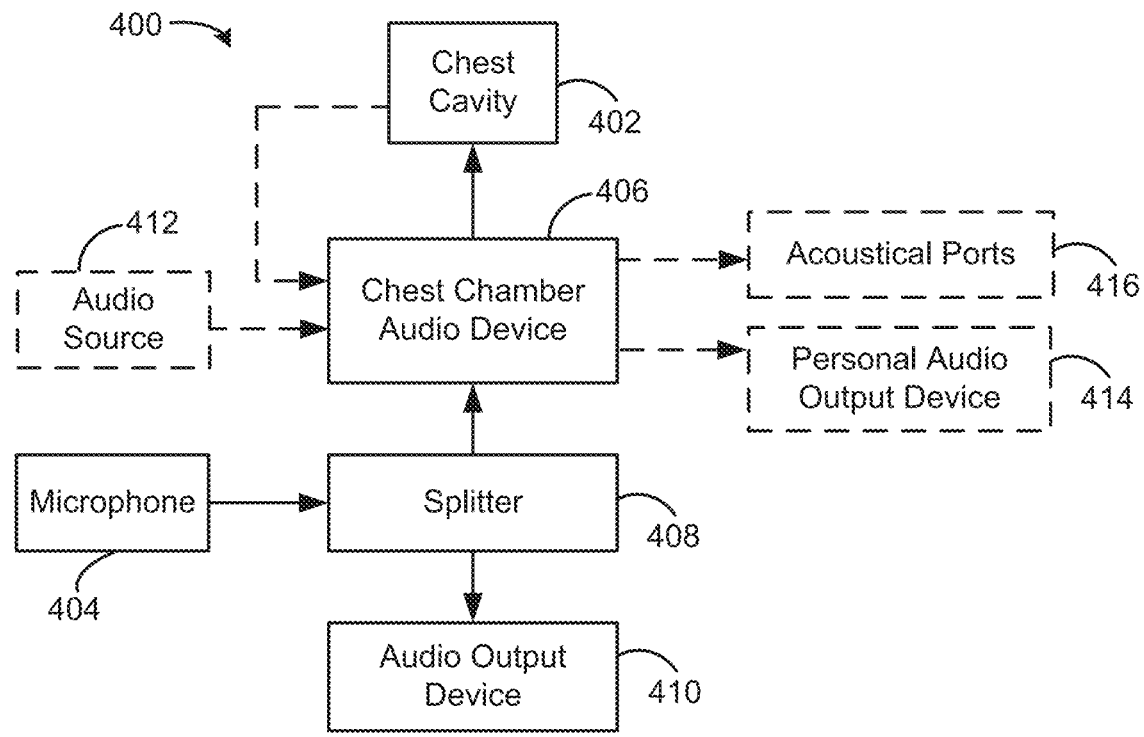
FIG. 4 is a block diagram of another example system comprising the chest chamber resonance device shown in FIG. 3, in accordance with embodiments.

FIG. 4 illustrates an exemplary system 400 for generating chest-chamber acoustic resonance within a chest cavity 402 of a user based on an audio signal representing the user's own voice, as detected by a microphone 404 included in the system 400. In some embodiments, the system 400 can be used to carry out the Exemplary Application 3 described herein or other performance scenarios.

As shown in FIG. 4, the system 400 includes a chest chamber resonance device 406 that is similar to the chest chamber resonance device 306 shown in FIG. 3 and described herein. The user's voice signal can be provided to a splitter 408 that splits the audio signal between the device 406 and at least one audio output device 410. The audio output device 410 may be one or more of a loudspeaker, personal address system, a stereo system, or other external audio system for delivering the audio content (e.g., the user's voice) to the user and/or an audience, for example, in the case of a live performance. The chest chamber resonance device 406 can be worn by the user to generate chest chamber acoustic resonance within the chest cavity 402 of the user based on the user's own voice. This resonance may amplify and enrich the base tonality of the user's voice as it is picked up by the microphone 404 and output to an audience or other listener via the audio output device 410.

As a result, the audible output of the system 400 can be a combination of the user's voice signal and the chest chamber acoustic resonance generated based thereon.

According to embodiments, the chest chamber resonance device 406 may include an audio input (such as, e.g., the audio input port 312 shown in FIG. 3) that is communicatively coupled to the splitter 408 via a wired connection (e.g., an audio wire) or a wireless connection (e.g., Bluetooth or WiFi). Likewise, the voice signal may be transmitted to the audio output device 410 from the splitter 408 via a wired or wireless connection. In embodiments, the splitter 408 may be included in any one of the microphone 404, the chest chamber resonance device 406, or the audio output device 410.

In some embodiments, the system 400 further includes a second audio source 412 that provides a second audio signal to the chest chamber resonance device 406. The second audio source 412 can be coupled to an audio input (such as, e.g., the audio inputs 312 shown in FIG. 1) of the chest chamber resonance device 406 via a wired or wireless connection. The chest chamber resonance device 406 may use both the second audio signal and the voice signal received from the microphone 404 to generate chest chamber acoustic resonance in the chest cavity 402 of the user. For example, the chest chamber resonance device 406 may include an audio receiver (such as, e.g., the audio receiver 324 shown in FIG. 3) that is configured to receive and process the second audio signal and the user's voice signal, so that both signals drive a vibration device (such as, e.g., the vibration device 315 shown in FIG. 3) for generating vibrations in the chest cavity 402 of the user.

As an example, the second audio source 412 can be a second microphone for capturing another person's voice (e.g., singing or speaking), and the chest chamber resonance device 406 can use the second voice signal to augment the vocal tone of the user's voice, so that the two users speak, sing, or harmonize in unison. As another example, the second audio source 412 can be one or more musical instruments, or a second microphone for capturing music played by the one or more instruments, and the chest chamber resonance device 406 can use the music signal(s) to resonate the chest chamber of the vocalist to produce uniquely augmented vocalizations. In some embodiments, the chest chamber resonance device 406 can be configured to receive a plurality of secondary audio input signals, including, for example, one or more voice signals from other users, one or more music signals from musical instruments, one or more audio signals from media players (e.g., portable media players, stereo systems, etc.), and others. In such cases, the system 400 can include a plurality of secondary audio sources, including the second audio source 412.

In some embodiments, the system 400 further includes one or more personal audio output devices 414 for providing an audio output of the chest chamber resonance device 406 to the user. For example, the voice signal received from the microphone 404 may be output to earphones, or other personal audio output devices 414 worn by the user, while also being provided to the vibration device included in the chest chamber resonance device 406, as described herein with respect to FIG. 3. In such cases, the user can hear his/her own voice, while feeling the chest chamber acoustic resonance that is associated with their voice and generated by the device 406. In the case of multiple audio sources, the personal audio output device 414 may output a combination of the audio signals received by the device 406 (e.g., the user's voice signal and any external audio signals).

In some embodiments, the system 400 also includes a pair of acoustical ports 416 (e.g., similar to the acoustical ports 318 shown in FIG. 3) for providing audio and/or vibratory resonance associated with the audio signal(s) received by the device 406 to the ears of the user. For example, the device 406 can include sensors (such as, e.g., audio and vibration gathering sensors 316 shown in FIG. 3) for detecting audio and/or vibratory resonance within the chest cavity 402 of the user and providing the detected frequencies to the acoustical ports 416. In such cases, the user can feel the resonance as physical or haptic vibrations on a skin surface of the ears, while also feeling the acoustic resonance in the chest cavity 402 and listening to the audio signal(s) via the personal audio output device 414 or the audio output device 410.

Figure 5:
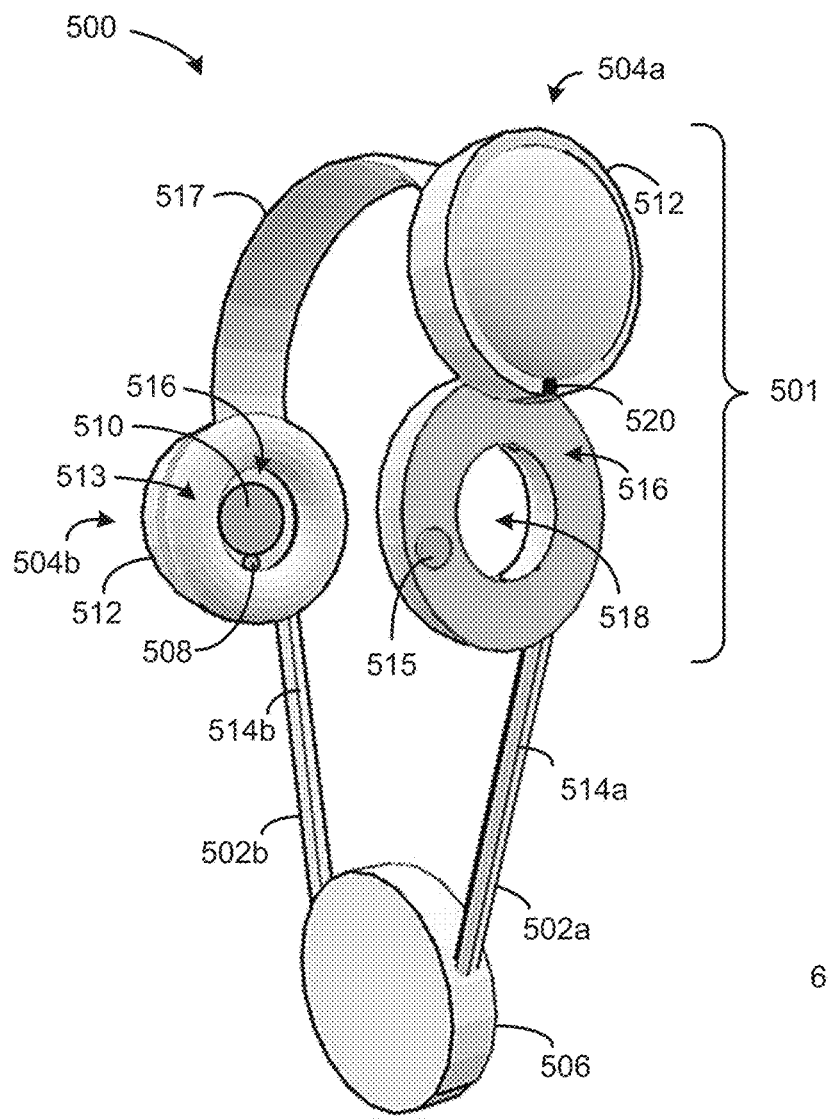
FIG. 5 illustrates another exemplary device for generating chest-camber acoustic resonance and delivering the resultant audio and haptic to headphones, in accordance with embodiments.

FIG. 5 illustrates an exemplary system 500 for simultaneously delivering an auditory output to an ear of a user and vibrational output to a skin surface of the ear, in accordance with certain embodiments. As shown, the system 500 includes a headphone unit 501 coupled to a chest chamber resonance device 506 that is similar to the chest chamber resonance device 306 shown in FIG. 3 and described herein. In embodiments, the headphone unit 501 may be used to implement the acoustic system 308 shown in FIG. 3, for example, in embodiments where left and right acoustical ports 318 are incorporated into left and right audio output devices 314, respectively (e.g., similar to the device 100 shown in FIG. 1).

As shown in FIG. 5, the system 500 includes left and right transfer tubes 502a, 502b that are respectively coupled to left and right earpieces 504a, 504b of the headphone unit 501 at corresponding terminal ends of the tubes 502a, 502b. As also shown, the opposing ends of the transfer tubes 502a, 502 are coupled to the chest chamber resonance device 506. The chest chamber resonance device 506 can include audio and vibration gathering sensors (such as, e.g., the sensors 316 shown in FIG. 3) for detecting audio and/or vibratory frequencies resulting from chest chamber acoustic resonance generated in a chest cavity of the user. The sensors can be positioned over left and right sides of the chest cavity and can be configured to transfer detected vibrations to the left and right earpieces 504a, 504b through the left and right transfer tubes 502a, 502b, respectively. In embodiments, the transfer tubes 502a, 502b may be stethoscope-like tubes configured to transfer sounds and/or vibrations from the device 506 to the earpieces 504a, 504b using air and mechanical conduction, similar to the transfer tubes 108a and 108b shown in FIG. 1.

In embodiments, the earpieces 504a, 504b can be configured to impart physical or tactile vibrations to the skin surface of the user, while also delivering an auditory signal to the ears of the user. For example, each of the earpieces 504a, 504b may include an acoustical chamber 508 for receiving sounds and vibrations from the respective transfer tube 502a, 502b. In some embodiments, the transfer tubes 502a, 502b may terminate at, or be directly coupled to, the acoustical chamber 508 of the corresponding earpiece 504a, 504b in order to facilitate mechanical conduction of the sounds and vibrations to the ears of the user. In addition, each of the earpieces 504a, 504b may further include an audio headphone driver 510, such as, e.g., an electroacoustic transducer or other speaker, for audibly reproducing the audio signal to the ears of the user. The audio headphone driver 510 may be housed in an audio driver housing 512, as shown in FIG. 5. In the illustrated embodiment, the earpieces 504a, 504b are configured as over-ear headphones designed to fit over, or cover, the outer ear of the user. As such, each earpiece 504a, 504b may include an ear pad 513 configured to rest against and/or around the user's outer ear. In other embodiments, the earpieces 504a, 504b may be configured as earbuds or earphones, such as, for example, the acoustic system 600 shown in FIG. 6.

In the illustrated embodiment, audio wires 514a, 514b electrically couple the earpieces 504a, 504b, respectively, to the chest chamber resonance device 506 and are configured to transmit the full-range audio signal to the audio headphone driver 510. As shown, the audio wires 514a, 514b may be embedded within the transfer tubes 502a, 502b, respectively, similar to the audio wires 110a, 110b shown in FIG. 1. In other embodiments, one or more of the earpieces 504a, 504b may include a wireless receiver for wirelessly receiving the audio signal from the chest chamber resonance device 506. In such cases, the system 500 may not include the audio wires 514a, 514b.

In some embodiments, each of the earpieces 504a, 504b includes a vibration device 515, such as, for example, a micro-transducer, an actuator, or other haptic device for converting an electrical signal into vibrations. The electrical signal may represent the audio and vibratory resonance detected by the sensors 316 placed against the chest cavity 302 of the user 304. The electrical signal for driving the vibration device 515 may be received from the chest chamber resonance device 506 via a wired connection (such as, e.g., the audio wires 514a, 514b) or wireless connection. In case of the latter, one or more of the earpieces 504a, 504b may further include a wireless receiver for receiving wireless signals from the device 506.

The vibration device 515 may be positioned on, or adjacent to, a location of the corresponding earpiece 504a, 504b that is in contact with the ear, so that the vibrations can be imparted to the skin surface of the ear. For example, in the illustrated embodiment, the vibration device 515 is positioned on, or embedded in, a vibration plate 516 (also referred to herein as an "ear pad pedestal and vibration plate") attached to a back side of the ear pad 513. The vibrations imparted by the vibration device 515 may cause the entire plate 516 to vibrate, which may be translated to the user's ears through the ear pad 513. As shown in FIG. 5, the acoustical chamber 508 may also be housed in or positioned on the vibration plate 516. In embodiments, the vibration plate 516 may be a thin disc composed of rigid vibratory conductive material. The plate 516 can serve to transfer vibration from the vibration transducer 515 to the ear pad 513, which then imparts vibration to the skin surface and bone structure surrounding the ear. The vibration plate 516 can also act as a structural attachment point for a headband 517 of the headphone device 501. As shown, the headband 517 connects the two earpieces 504a, 504b and may rest on top of the user's head when the headphone device 501 is worn.

In some embodiments, the earpieces 504a, 504b includes either the vibration device 515 or the acoustic chamber 508 as the acoustical port 318. In other embodiments, the earpieces 504a, 504b include both the vibration device 515 and the acoustical chamber 508, and the acoustical port 318 for each ear includes both components. In some such cases, the user may choose whether to receive resonance-based vibrations through the vibration device 515 or through the acoustical chamber 508. For example, one or more of the earpieces 504a, 504b and/or the chest chamber resonance device 506 may include an input device for receiving user selection of one of the two components of the acoustical ports 318. In other such cases, the vibration device 515 may be used to deliver resonance-based vibrations associated with an external audio source (such as, e.g., the second audio source 412 shown in FIG. 4), while the acoustical chamber 508 is used to deliver resonance-based vibrations associated with the user's own voice signal (e.g., as captured by the microphone 404 shown in FIG. 4).

In embodiments, each of the earpieces 504a, 504b may include an aperture or opening 518 for enabling ambient sound to enter the corresponding earpiece 504a, 504b, so that the user can still hear environmental noise while wearing the earpiece 504. In the illustrated embodiment, the opening 518 is through a center of the vibration plate 516 and can be accessed by pivoting the audio driver housing 512 up and away from the vibration plate 516, so that the opening 518 is exposed. To that end, each earpiece 504a, 504b may further include a swivel mount 520 for enabling movement of the audio driver housing 512 relative to the vibration plate 516. In FIG. 5, the audio driver housing 512 for the earpiece 504a is shown in the "up" or "open" position, while the audio driver housing 512 for the other earpiece 504b is shown in the down or closed position.

According to further embodiments, FIG. 5 shows a uniquely modified audio headphone device 501 with right and left earpieces 504a, 504b each composed of two halves, the outer half called the audio driver housing 512, and the inner half composed of the ear pad 513, the ear pad pedestal and vibration plate 516, and the vibration transducer 515 embedded in the ear pad pedestal and vibration plate 516. Each audio driver housing 512 has the ability to pivot up and away from the inner half of the earpiece 504a, 504b via the swivel mount 520. Each audio driver housing 512 includes an audio headphone driver 510 and an acoustical chamber 508.

In embodiments, when the audio driver housings 512 are in the down position, the device 500 can operate in a standard mode. During the standard mode, the incoming audio signal is split so that the user can feel and hear low-end chest chamber resonance vibration via the transfer tubes 502a, 502b and acoustic portals, in synchrony with the audio track sent to the audio headphone driver 510, either via the audio wire or wirelessly via a headphone receiver (not shown).

In some cases, the chest chamber resonance low-end vibration may be imparted to the ears through the aperture or acoustical chamber 508 serving as the acoustic portal, as shown in FIG. 5. In other cases, the chest chamber resonance low-end vibration may be imparted to the ears through an acoustic portal (not shown) that is adjacent to, but not in contact with, the diaphragm (not shown) of the audio headphone driver 510. In such cases, the chest chamber resonance low-end vibration is imparted to the diaphragm which then drives the vibration to the eardrum of the listener.

In another embodiment, when the audio driver housings 510 are in the up position, the transfer tubes 502a, 502b can be selectively disconnected from the acoustic chambers 508. This creates an open ambient portal through which ambient sound can be heard by the user. In this embodiment, the audio signal is split, to be received wirelessly or via hardwire by, but not limited to, a stereo system with external speakers, and the chest chamber resonance is transmitted via hardwire or wirelessly from the microphone version of the vibration and audio gathering sensors (not shown) to a suitable receiver in the headphone unit 501 (not shown) for the vibration transducer 515 embedded in the vibration plate 516. In this embodiment, the user may listen to an audio track played by an external speaker system while simultaneously feeling the vibratory component of chest chamber resonance in the chest and around the ear via the vibration transducer 515. The user in this mode is also free to hear other ambient sound coming from the user's environment. The user, as with all other embodiments, has the ability to modulate the amplitude of both the audio signal to the external speakers or other audio output, and the chest chamber resonance signal. In some cases, the headphone device 501 may also house the electronics for splitting the incoming audio signal and/or processing the audio signal (e.g., the PCB 322), instead of having these components housed in the chest chamber resonance device 506.

Figure 6:
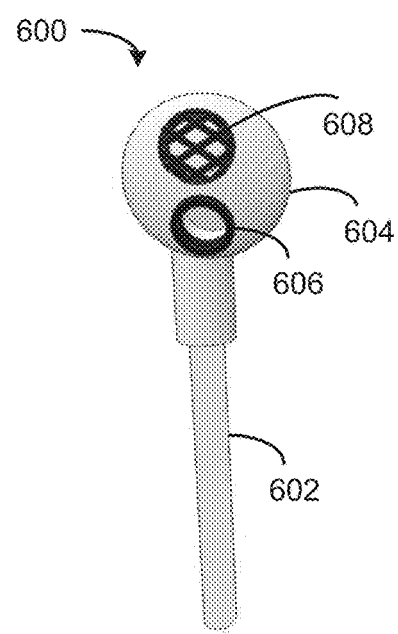
FIG. 6 is a partial view of an exemplary acoustic system in accordance with embodiments.

FIG. 6 illustrates an exemplary acoustic system 600 for simultaneously delivering an auditory output to an ear of a user and a vibrational output to a skin surface of the ear, in accordance with certain embodiments. As an example, the acoustic system 600 may serve as a left ear unit or a right ear unit of the acoustic system 308 shown in FIG. 3 in embodiments where left and right acoustical ports 318 are incorporated into left and right audio output devices 314, respectively (e.g., similar to the device 100 shown in FIG. 1).

As shown in FIG. 6, the acoustic system 600 includes a transfer tube 602 that is mechanically coupled to an earpiece 604 at a terminal end of the tube 602. An opposing end (not shown) of the transfer tube 602 can be coupled to the sensors 316 included in the chest chamber audio device 306 for detecting audio and/or vibratory frequencies resulting from chest chamber acoustic resonance 316 generated in the chest cavity 302 of the user 304. The detected vibrations can be transferred to the earpiece 604 through the transfer tubes 602 via air and mechanical conduction. In embodiments, the transfer tube 602 may be similar to the transfer tubes 108a and 108b shown in FIG. 1.

The earpiece 604 can be worn in or adjacent to the ears of the user and can be configured to impart physical vibrations to the skin surface of the user, while also delivering an auditory signal to the ears of the user. For example, the earpiece 604 may include an acoustical chamber 606 for receiving sounds and vibrations from the transfer tube 602. In such cases, the acoustical chamber 606 serves as the acoustical port 318 shown in FIG. 3. Though not shown in FIG. 6, the transfer tube 602 may terminate at, or be directly coupled to, the acoustical chamber 606 in order to facilitate mechanical conduction of these sounds and vibrations. As shown in FIG. 6, the earpiece 604 may further include a speaker 608, such as, e.g., an electroacoustic transducer or audio driver, for audibly reproducing the audio signal to the ears of the user. In embodiments, the speaker 608 may be a standard earphone speaker. In the illustrated embodiment, the earpiece 604 is an ear bud designed to fit directly in the outer ear and face but not enter the ear canal. In other embodiments, the earpiece 604 may be configured as an in-ear headphone that enters the ear canal.

In embodiments, an audio wire (not shown) electrically couples the earpiece 604 to the chest chamber audio device 306 for transmitting the full-range audio signal to the speaker 608. In some cases, the audio wire may be wrapped around an outside surface of the transfer tube 602. In other cases, the audio wire may be embedded within the transfer tube 602, for example, as shown in FIG. 1. In other embodiments, the earpiece 604 may include a wireless receiver for wirelessly receiving the audio signal from the chest chamber audio device 306. In such cases, the acoustic system 600 may not include the audio wire.

In some embodiments, the acoustic system 600 may include a swivel mount (not shown) for pivoting the speaker 608 away from the acoustic chamber 606, so that the user can listen to ambient audio while receiving corresponding chest chamber acoustic resonance vibrations through the acoustic portal 606. For example, the earpiece 604 may be split into two halves that pivot at the swivel mount, one half including the speaker 608 and the other half including the acoustic chamber 606, like the earpieces 504a, 504b shown in FIG. 5.

Figure 7:
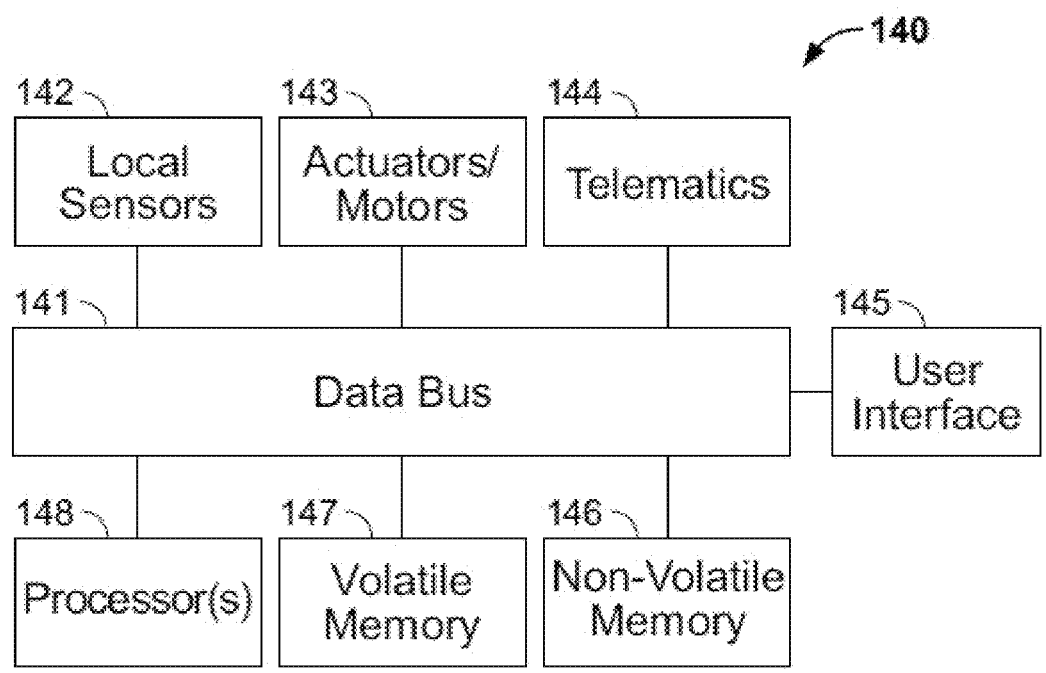
FIG. 7 is a block diagram of an example controller in accordance with embodiments.

FIG. 7 shows a generic controller 140. DSPs 328 and 332, audio receiver 324, and/or PCB 322 may include any or all of the features of generic controller 140. Generic controller 140 enables automatic control of mechanical systems (if any) and facilitates external communication. Generic controller 140 can include a data bus 141, one or more processors 148, volatile memory 147, non-volatile memory 146, one or more user interfaces 145, telematics 144, actuators and motors 143, and local sensors 142.

Data bus 141 traffics electronic signals or data between the electronic components. Processor 148 performs operations on electronic signals or data to produce modified electronic signals or data. Volatile memory 147 stores data for near-immediate recall by processor 148. Non-volatile memory 146 stores data for recall to the volatile memory 147 and/or the processor 148. Non-volatile memory 146 can include a range of non-volatile memories, such as, for example, hard drives, SSDs, DVDs, Blu-Rays, etc. User interface 145 can includes displays (e.g., touch-screen, VR), lights, keyboards, buttons, and other devices that enable user interaction with the computing system. Telematics 144 can enable wired and/or wireless communication with external entities via Bluetooth, cellular data (e.g., 3G, LTE), USB, WiFi, etc.

Actuators/motors 143 produce tangible results. Examples of actuators/motors 143 include vibration device 315 and haptic transducers. Local sensors 142 transmit digital or analog readings or measurements to processors 148. Examples of local sensors 148 include temperature sensors, rotation sensors, speed sensors, cameras, lidar sensors, radar sensors, infrared sensors, ultrasonic sensors, clocks, moisture sensors, rain sensors, light sensors, door sensors, weight sensors, etc.

Thus, embodiments described herein provide a device for splitting a specific range of audio vibrations from a full range audio signal and introducing these vibrations into the user's chest cavity to produce chest-chamber acoustic resonance, which is then harvested in stethoscope-like fashion and transmitted to the ears as unique audio and haptic. The device allows the user to experience this unique body modified tone simultaneously with the full range audio track from which the targeted frequency signal was split, for a richer audio and haptic immersion to be used with the audio component of any form of electronic media. The device can also be programmed to produce vibration in response to other types of signals imbedded in the entertainment format. In addition, the device may also be used in relaxation and biofeedback training. Via an attached microphone, the device can also be used as a means of augmenting the bass-tone component of the user's own voice, or the bass-tones or other sound frequencies occurring in the ambient environment of the user.

Any process descriptions or blocks in the figures, such as FIGS. 3 and 4, should be understood as representing modules, segments, or portions of code that include one or more executable instructions for implementing specific logical functions or steps in the process, and alternate implementations are included within the scope of the embodiments described herein, in which functions may be executed out of order from that shown or discussed, including substantially concurrently or in reverse order, depending on the functionality involved, as would be understood by those having ordinary skill in the art.

The above-described embodiments, and particularly any "preferred" embodiments, are possible examples of implementations and merely set forth for a clear understanding of the principles of the invention. Many variations and modifications may be made to the above-described embodiment(s) without substantially departing from the spirit and principles of the techniques described herein. All modifications are intended to be included herein within the scope of this disclosure and protected by the following claims.

What is claimed is:

1. A system for enhancing an audio listening experience, comprising:
    an electrical device comprising:
        a vibration device configured to impart vibrations to a chest area of a user based on an incoming audio signal,
        at least one sensor configured to detect an acoustic resonance generated in a chest cavity of the user as a result of the vibrations, and
        a housing configured to encase the vibration device and the at least one sensor; and
    an acoustic system comprising:
        at least one acoustical port configured to be worn in at least one ear of the user, and
        an audio output device separate from the at least one acoustical port,
        the acoustic system configured to output the incoming audio signal, via the audio output device, in synchrony with the vibrations imparted to the chest cavity of the user via the vibration device, and simultaneously deliver, to the at least one ear of the user, haptic and audible vibrations corresponding to the detected acoustic resonance, via the at least one acoustical port.

2. The system of claim 1, wherein the at least one sensor comprises a microphone configured to generate an electrical signal based on the detected acoustic resonance, the electrical signal representing the haptic and audible vibrations produced by the acoustic resonance in the chest cavity.

3. The system of claim 2, wherein the microphone is configured to transmit the electrical signal to the at least one acoustical port, and the at least one acoustical port comprises a haptic transducer configured to vibrate according to the electrical signal to provide the haptic and audible vibrations to the at least one ear of the user.

4. The system of claim 3, wherein the electrical signal is wirelessly transmitted from the electrical device to the acoustic system.

5. The system of claim 1, further comprising at least one transfer tube mechanically coupled between the at least one sensor and the at least one acoustical port for transferring the haptic and audible vibrations to the at least one ear.

6. The system of claim 5, wherein the at least one sensor is a resonator configured to pick up the haptic and audible vibrations produced by the acoustic resonance and deliver the detected vibrations to the at least one ear of the user through the at least one transfer tube.

7. The system of claim 6, wherein the transfer tubes are configured to use air and mechanical conduction to transmit the vibrations picked up by the resonator to the at least one acoustical port.

8. The system of claim 1, wherein the audio output device comprises a personal audio output device configured to be worn at the ears of the user and comprising an audio driver for outputting the incoming audio signal to the ears.

9. The system of claim 1, wherein the incoming audio signal is wirelessly transmitted to the audio output device.

10. The system of claim 1, wherein the vibrations imparted to the chest area are based on a selected frequency range of the incoming audio signal.

11. A wearable device for enhancing an audio listening experience, comprising:
    an audio input device for receiving an incoming audio signal from an audio source;
    a vibration device configured to impart vibrations, to a chest area of the user, based on the incoming audio signal;
    at least one sensor configured to detect an acoustic resonance generated in a chest cavity of the user as a result of the vibrations;
    at least one audio output port configured to output the incoming audio signal in synchrony with the vibrations imparted to the chest cavity; and
    at least one vibration output port separate from the at least one audio output port and in communication with the at least one sensor, the at least one vibration output port being configured to output haptic and audible vibrations representing the acoustic resonance detected by the at least one sensor.

12. The wearable device of claim 11, wherein the at least one sensor is a microphone configured to generate an electrical signal based on the detected acoustic resonance, the electrical signal representing the haptic and audible vibrations produced by the acoustic resonance in the chest cavity.

13. The wearable device of claim 11, wherein the at least one sensor is a resonator configured to pick up the haptic and audible vibrations produced by the acoustic resonance.

14. The wearable device of claim 11, wherein the vibrations imparted to the chest area are based on a selected frequency range of the incoming audio signal.

15. A headphone system, comprising:
    an audio driver for outputting an incoming audio signal to at least one ear of a user;
    at least one acoustical port separate from the audio driver and configured to deliver haptic and audible vibrations to the at least one ear in synchrony with the incoming audio signal, the haptic and audible vibrations representing an acoustic resonance generated in a chest cavity of the user based on the incoming audio signal;
    a first housing comprising the audio driver;
    a second housing comprising the at least one acoustical port; and
    a swivel mount pivotably connecting the first housing to the second housing.

16. The headphone system of claim 15, wherein the at least one acoustical port is a haptic transducer configured to vibrate according to an electrical signal representing the haptic and audible vibrations produced by the acoustic resonance in the chest cavity.

17. The headphone system of claim 15, wherein the at least one acoustical port is an acoustic chamber configured to deliver the haptic and audible vibrations produced by the acoustic resonance to the at least one ear using air and mechanical conduction.

18. The headphone system of claim 15, further comprising an aperture configured to expose the user's ear to ambient sound.

* * * * *